(12) United States Patent
Henze et al.

(10) Patent No.: US 8,822,624 B2
(45) Date of Patent: Sep. 2, 2014

(54) THERMOPLASTIC POLYURETHANE WITH REDUCED FORMATION OF DEPOSIT

(75) Inventors: Oliver Steffen Henze, Damme (DE); Stephan Friederichs, Osnabrueck (DE); Ruediger Krech, Diepholz (DE); Katja Hackmann, Lohne (DE); Marc Hansen, Mellinghausen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/918,910

(22) PCT Filed: Feb. 19, 2009

(86) PCT No.: PCT/EP2009/051983
§ 371 (c)(1),
(2), (4) Date: Aug. 23, 2010

(87) PCT Pub. No.: WO2009/103767
PCT Pub. Date: Aug. 27, 2009

(65) Prior Publication Data
US 2011/0003961 A1  Jan. 6, 2011

(30) Foreign Application Priority Data
Feb. 22, 2008 (EP) .................... 08151786

(51) Int. Cl.
C08G 18/32 (2006.01)
C09K 3/00 (2006.01)
B29C 45/00 (2006.01)
C08G 18/34 (2006.01)
C08G 18/73 (2006.01)
C08G 18/66 (2006.01)

(52) U.S. Cl.
CPC .............. C08G 18/664 (2013.01); C08G 18/73 (2013.01); C08G 18/3206 (2013.01)
USPC ........ 528/66; 528/65; 252/182.24; 264/328.1

(58) Field of Classification Search
CPC ........... C08G 18/32; C09K 3/00; B29C 45/00
See application file for complete search history.

(56) References Cited

U.S. PATENT DOCUMENTS

| 6,518,389 | B1 * | 2/2003 | Kaufhold et al. | 528/59 |
| 2001/0044516 | A1 * | 11/2001 | Kaufhold et al. | 528/65 |
| 2006/0142531 | A1 * | 6/2006 | Peerlings et al. | 528/44 |
| 2007/0265413 | A1 * | 11/2007 | Peerlings et al. | 528/79 |

FOREIGN PATENT DOCUMENTS

| DE | 29 01 774 | 7/1980 |
| DE | 10 2006 021 734 | 11/2007 |
| EP | 1 010 712 | 6/2000 |
| EP | 1 043 349 | 10/2000 |
| EP | 1 149 851 | 10/2001 |
| EP | 1 153 951 | 11/2001 |
| EP | 1 674 494 | 6/2006 |
| EP | 1 854 818 | 11/2007 |

OTHER PUBLICATIONS

International Search Report issued Aug. 5, 2009 in PCT/EP09/051983 filed Feb. 19, 2009.

* cited by examiner

*Primary Examiner* — Randy Gulakowski
*Assistant Examiner* — Jeffrey Washville
(74) *Attorney, Agent, or Firm* — Oblon, Spivak, McClelland, Maier & Neustadt, L.L.P.

(57) ABSTRACT

A thermoplastic polyurethane is obtainable via reaction of the following components A, B, C, and, if appropriate, D and E
  (e) at least one aliphatic, organic diisocyanate, as component A,
  (f) at least one compound which is reactive toward component A and which has a weight-average molar mass of from 500 to 10 000 g/mol, as component B,
  (g) a mixture composed of alkanediols as chain extenders, comprising from 60 to 85 mol % of 1,6-hexanediol as main chain extender C1 and from 15 to 40 mol % of 1,3-propanediol as co-chain extender C2, as component C,
  (h) at least one catalyst, as component D,
  (i) conventional additives as component E.

14 Claims, No Drawings

THERMOPLASTIC POLYURETHANE WITH REDUCED FORMATION OF DEPOSIT

The invention relates to thermoplastic polyurethanes with reduced deposit formation, processes for their production, their use for the production moldings, and also the use of specific mixtures of alkanediols as chain extenders.

Aromatic, thermoplastic polyurethanes (aromatic TPUs) are not resistant to light, because their structure is composed of aromatic diisocyanates. These polyurethanes have a tendency toward marked yellowing.

Aliphatic, thermoplastic polyurethanes (TPUs) have therefore been developed which have improved resistance to yellowing and are also heat-resistant.

EP-A-1 010 712 relates to aliphatic, thermoplastic polyurethanes which are obtainable from hexamethylene diisocyanate (HDI) as diisocyanate component, and from polyester polyols, chain extenders, and UV stabilizers. The chain extenders used comprise 1,6-hexanediol, or a mixture composed of from 80 to 100% by weight of 1,6-hexanediol and from 0 to 20% by weight of chain extenders whose average molar mass is from 60 to 500 g/mol.

EP-A-1 153 951 relates to moldings composed of thermoplastic polyurethanes with reduced fogging. The polyurethanes are composed of an organic diisocyanate, and of polyester polyols, and of diol chain extenders and/or diamine chain extenders. The chain extenders used comprise aliphatic diols or diamines whose molar mass is from 60 to 500. Particular preference is given to use of 1,6-hexanediol, which can, if appropriate, be used in a blend with up to 20% by weight of chain extenders whose average molar mass is from 60 to 500 g/mol.

EP-A-1 043 349 relates to thermoplastically processable polyurethane molding compositions which are intended to be free from by-products that can migrate and to have high lightfastness. Chain extenders used comprise 1,5-pentanediol, 1,6-hexanediol, or 1,4-cyclohexanediol.

DE-A-10 20 06 021 734 relates to aliphatic, sinterable, thermoplastic polyurethane molding compositions with improved effluence behavior. The molding compositions comprise a mixture of chain extenders, where one chain extender is obtained via reaction of carboxylic acids or dicarboxylic acids with alcohols and has a molar mass of from 104 to 500 g/mol.

Aliphatic, thermoplastic polyurethanes based on hexamethylene diisocyanate have relatively high tendency toward efflorescence of low-molecular-weight constituents, and this inhibits use in many sectors. The tendency toward efflorescence can be reduced via use of suitable chain extenders, but the known chain extenders described above are not adequate for all application sectors. HDI-based thermoplastic polyurethanes are especially used in automobile interiors and in sectors exposed to a high level of insolation, because the materials have good mechanical and thermal properties. These are sectors where the good mechanical properties and the comparatively high softening points are valuable. However, for these applications it is important to reduce the tendency toward efflorescence or the formation of deposit on moldings produced from thermoplastic polyurethanes.

It is an object of the present invention to provide thermoplastic polyurethanes which eliminate the disadvantages of the known thermoplastic polyurethanes and which exhibit reduced formation of deposit or reduced tendency toward efflorescence.

The invention achieves the object via a thermoplastic polyurethane, obtainable via reaction of the following components A, B, C, and, if appropriate, D and E (a) at least one aliphatic, organic diisocyanate, as component A,
(b) at least one compound which is reactive toward component A and which has a weight-average molar mass of from 500 to 10 000 g/mol, as component B,
(c) a mixture composed of alkanediols as chain extenders, comprising from 60 to 85 mol % of 1,6-hexanediol as main chain extender C1 and from 15 to 40 mol % of 1,3-propanediol as co-chain extender C2, as component C,
(d) at least one catalyst, as component D,
and conventional additives, as component E.

According to the invention, it has been found that specific mixtures composed of 1,6-hexanediol and 1,3-propanediol as chain extenders can markedly reduce the tendency toward efflorescence of thermoplastic polyurethanes based on aliphatic, organic diisocyanates, and can thus dependably inhibit formation of deposit.

The mixtures of the invention, composed of alkanediols, comprise from 60 to 85 mol %, preferably from 65 to 80 mol %, in particular from 70 to 78 mol %, of 1,6-hexanediol as main chain extender C1, and from 15 to 40 mol %, preferably from 20 to 35 mol %, in particular from 22 to 30 mol %, as co-chain extender.

The specific combination of said alkanediols can very substantially inhibit efflorescence of low-molecular-weight constituents.

The preparation of the alkanediols is known to the person skilled in the art, and they are commercially available.

In applications where requirements for lightfastness are not very stringent, portions of the aliphatic diols of the chain extenders, for example up to 50% by weight, can be replaced by aromatic diols. The chain extender is preferably composed of 1,6-hexanediol and 1,3-propanediol as diols. Small amounts of conventional monofunctional compounds can moreover be used, for example as chain terminators or mold-release agents. By way of example, mention may be made of alcohols, such as octanol and stearyl alcohol.

The chain extenders are used together with at least one aliphatic, organic diisocyanate, as component A, with at least one compound which is reactive toward component A and whose weight-average molar mass is from 500 to 10 000 g/mol, as component B, and, if appropriate, with catalysts and conventional additives, as components D and E.

The amount used, based on the polyol, of the chain extenders of component C is preferably from 5 to 130% by weight.

If a catalyst is used concomitantly, as component D, its amount preferably used is from 1 to 1000 ppm, based on the thermoplastic polyurethane.

The amounts used of conventional additives of component E are preferably from 0 to 50% by weight, particularly preferably from 0 to 40% by weight, based on the entire thermoplastic polyurethane.

The component A used comprises at least one aliphatic, organic diisocyanate. Examples are ethylene diisocyanate, tetramethylene 1,4-diisocyanate, hexamethylene 1,6-diisocyanate, dodecane 1,12-diisocyanate, and mixtures thereof. Among these, particular preference is given, as component A, to hexamethylene diisocyanate or a mixture composed of at least 80% by weight of hexamethylene diisocyanate and up to 20% by weight of further aliphatic, organic diisocyanates.

The term aliphatic diisocyanates also includes cycloaliphatic diisocyanates, such as isophorone diisocyanate, cyclohexane 1,4-diisocyanate, 1-methylcyclohexane 2,4-diisocyanate, 1-methylcyclohexane 2,6-diisocyanate, and also their isomer mixtures, dicyclohexylmethane 4,4'-diisocyanate, dicyclohexylmethane 2,4'-diisocyanate, and dicyclohexylmethane 2,2'-diisocyanate, and also the corresponding isomer mixtures.

As a function of requirements placed upon the moldings to be produced from the TPUs, up to 25% by weight of the hexamethylene diisocyanate (HDI) can be replaced by one or more other aliphatic diisocyanates, such as isophorone diisocyanate, cyclohexane 1,4-diisocyanate, 1-methylcyclohexane 2,4-diisocyanate, 1-methylcyclohexane 2,6-diisocyanate, and isomer mixtures thereof, dicyclohexyl 4,4'-, 2,4'-, and 2,2'-diisocyanate, and isomer mixtures thereof.

In applications where requirements placed upon lightfastness are not very stringent, up to 20% by weight of the aliphatic diisocyanate can also be replaced by aromatic diisocyanates, such as tolylene 2,4-diisocyanate, tolylene 2,6-diisocyanate, or diphenylmethane 4,4'-, 2,2'-, or 2,4'-diisocyanate.

The component B used preferably comprises polyols, in particular polyesterdiols.

The component B used can by way of example comprise polyester polyols, polyether polyols, polycarbonatediols, or a mixture composed of polyether polyols and of polyester polyols, or a mixture composed of polyether polyols and of polycarbonatediols, or a mixture composed of polyester polyols and of polycarbonatediols. The weight-average molar mass of component B here is preferably from 600 to 5000 g/mol, particularly preferably from 700 to 4200 g/mol. The materials are preferably linear hydroxyl-terminated polyols, which can comprise small amounts of non-linear compounds as a result of the production process.

Suitable polyesterdiols can by way of example be prepared from dicarboxylic acids having from 2 to 12 carbon atoms, preferably from 4 to 6 carbon atoms, and from polyhydric alcohols. Examples of dicarboxylic acids that can be used are: aliphatic dicarboxylic acids, such as succinic acid, glutaric acid, adipic acid, suberic acid, azelaic acid, and sebacic acid, and aromatic dicarboxylic acids, such as phthalic acid, isophthalic acid, and terephthalic acid. The dicarboxylic acids can be used individually or in the form of a mixture, e.g. in the form of a succinic, glutaric, and adipic acid mixture. For preparation of the polyesterdiols it can, if appropriate, be advantageous to use, instead of the dicarboxylic acids, the corresponding dicarboxylic acid derivatives, such as carboxylic diesters having from 1 to 4 carbon atoms in the alcohol radical, carboxylic anhydrides, or carbonyl chlorides. Examples of polyhydric alcohols are glycols having from 2 to 10, preferably from 2 to 6, carbon atoms, e.g. ethylene glycol, diethylene glycol, 1,4-butanediol, 1,5-pentanediol, 1,6-hexanediol, 1,10-decanediol, 2,2-dimethyl-1,3-propanediol, 1,3-propanediol, and dipropylene glycol. As a function of the desired properties, the polyhydric alcohols can be used alone or, if appropriate, in a mixture with one another. Other suitable compounds are esters of carbonic acid with the diols mentioned, in particular with those having from 4 to 6 carbon atoms, e.g. 1,4-butanediol or 1,6-hexanediol, condensates of hydroxycarboxylic acids, such as hydroxycaproic acid, and polymerization products of lactones, for example of, if appropriate substituted, caprolactones. Polyesterdiols whose use is preferred are ethanediol polyadipates, 1,4-butanediol polyadipates, ethanediol 1,4-butanediol polyadipates, 1,6-hexanediol neopentyl glycol polyadipates, 1,6-hexanediol 1,4-butanediol polyadipates. and polycaprolactones. The polyesterdiols have average molar masses of from 600 to 5000, preferably from 700 to 4200, and can be used individually or in the form of a mixture with one another.

Suitable polyetherdiols can be prepared by reacting one or more alkylene oxides having from 2 to 4 carbon atoms in the alkylene radical with a starter molecule which contains two active hydrogen atoms. Examples that may be mentioned of alkylene oxides are: ethylene oxide, propylene 1,2-oxide, epichlorhydrin, and butylene 1,2-oxide and butylene 2,3-oxide. It is preferable to use ethylene oxide, propylene oxide, and mixtures composed of propylene 1,2-oxide and ethylene oxide. The alkylene oxides can be used individually, in alternating succession, or in the form of a mixture. Examples of starter molecules that can be used are: water, aminoalcohols, e.g. N-alkyldiethanolamines, such as N-methyldiethanolamine, and diols, such as ethylene glycol, 1,3-propylene glycol, 1,4-butanediol, and 1,6-hexanediol.

It is also possible, if appropriate, to use a mixture of starter molecules. Other suitable polyetherdiols are the polymerization products of tetrahydrofuran, where these comprise hydroxy groups. It is also possible to use proportions of from 0 to 30% by weight, based on the bifunctional polyethers, of trifunctional polyethers, where the amount is, however, no more than that which produces a thermoplastically processable product. The substantially linear polyetherdiols have molar masses of from 600 to 5000, preferably from 700 to 4200. They can be used individually or else in the form of a mixture with one another.

Particular preference is given to polymerization products of tetrahydrofuran where these comprise hydroxy groups, and to polyetherdiols based on ethylene oxide and/or propylene oxide. Even if these preferred polyetherdiols are used only to some extent in polyol mixtures, in particular with 1,6-hexanediol as chain extender, the result is TPUs which exhibit only very little formation of deposit on the surface after accelerated aging tests (e.g. after storage at from 60 to 95° C.).

The ratio of equivalents of diisocyanate A to reactive compound B is preferably from 1.5:1.0 to 10.0:1.0. The NCO index is preferably from 95 to 105 (this being calculated by taking the quotient of the ratios of equivalents of isocyanate groups and of the total number of hydroxy groups from the polyol of component B and chain extender and multiplying this number by 100).

The thermoplastic polyurethanes of the invention can be prepared in the presence of at least one catalyst, as component D.

Suitable catalysts are tertiary amines which are conventional and are known from the prior art, examples being triethylamine, dimethylcyclohexylamine, N-methylmorpholine, N,N'-dimethylpiperazine, 2-(dimethylaminoethoxy)ethanol, diazabicyclo-[2.2.2] octane and similar compounds, and also in particular organometallic compounds, such as titanic esters, iron compounds, tin compounds, e.g. stannous diacetate, stannous dioctoate, stannous dilaurate, or the dialkyltin salts of aliphatic carboxylic acids, e.g. dibutyltin diacetate, dibutyltin dilaurate, or similar compounds. Preferred catalysts are organometallic compounds, in particular titanic esters, iron compounds or tin compounds. Dibutyltin dilaurate is very particularly preferred.

Conventional additives can moreover be used as component E. Suitable UV stabilizers are described by way of example in R. Gächter, H. Müller (editors), Taschenbuch der Kunststoff-Additive [Plastics Additives Handbook], 3rd edition, Hanser Verlag, Munich, 1989, Chapter "Polyurethane" [Polyurethanes]. Preferred UV stabilizers used comprise mixtures of hindered amine stabilizers (HALS) and of hydroxyphenylbenzotriazoles, for example in a ratio by weight of from 2:1 to 1:2.

Alongside the TPU components, UV stabilizers, and, if appropriate, catalysts, it is also possible to add auxiliaries and additives. Mention may be made by way of example of lubricants, such as fatty acid esters, metal soaps of these, fatty acid amides, and silicone compounds, antiblocking agents, inhibitors, stabilizers to counter hydrolysis, heat, and discoloration, flame retardants, dyes, pigments, and inorganic and organic fillers and reinforcing agents, where these may be prepared by the prior art and may also have been treated with a size. Further details concerning the auxiliaries and additives mentioned can be found in the technical literature, for example in J. H. Saunders, K. C. Frisch: "High Polymers", volume XVI, Polyurethane, parts 1 and 2, Interscience Publishers 1962 or 1964, R. Gächter, H. Müller (ed.): Taschenbuch der Kunststoff-Additive [Plastics Additives Handbook], 3rd edition, Hanser Verlag, Munich 1989, or DE-A-29 01 774.

The amounts preferably added of the lubricants are from 0.1 to 1.0% by weight, based on A)+B)+C). The preferred amounts used of the antioxidants are from 0.1 to 0.7% by weight, based on A) and B) and C).

According to one embodiment of the invention, the thermoplastic polyurethane of the invention has a hard phase fraction of >0.40, where the hard phase fraction is defined by the following formula:

$$\text{Hard phase fraction} = \left\{ \sum_{x=1}^{k} [(m_{CEx}/M_{CEx})^* M_{iso} + m_{KVx}] \right\} / m_{tot}$$

where:
$M_{CEx}$: molar mass of chain extender x in g/mol
$m_{CEx}$: mass of chain extender x in g
$M_{iso}$: molar mass of isocyanate used in g/mol
$m_{tot}$: total mass of all starting materials in g
k: number of chain extenders.

The thermoplastic polyurethanes of the invention are produced by reacting the stated components A, B, C, and, if appropriate, D and E with one another, with mixing.

The production process here can take place continuously or batchwise.

In the case of a continuous production process, it is preferable that components B and C are mixed continuously and then mixed intensively with the diisocyanate of component A (one-shot process). The reaction can then be completed in a discharge vessel, such as an extruder. The product obtained can, if appropriate, be pelletized. Reference may be made to EP-A-1 010 712, paragraphs [0031] to [0040] for suitable production processes.

The TPU of the invention is preferably produced continuously, and in particular here the polyol and the chain extender are mixed continuously, for example via a static mixer, this mixture being mixed with the diisocyanate, preferably HDI, for example in a static mixer, and reacted.

Additives can be added after the polymerization reaction via compounding or else during the polymerization reaction. By way of example, antioxidants and UV stabilizers can be dissolved in the polyol during the polymerization reaction. However, if an extruder is used, it is also possible by way of example to add lubricants and stabilizers in the second portion of the screw.

The thermoplastic polyurethanes of the invention are in particular used for the production of moldings via injection molding, extrusion, or sintering processes, or for the coating of moldings. They can thus by way of example be used for the production of foils or of injection moldings. The moldings are particularly preferably used in the automobile (interior) sector, or else in the mechanical engineering sector, furniture sector, sports sector, or leisure sector. The moldings here are preferably fittings in the automobile interior sector, examples being dashboards, door cladding, or steering-wheel covers.

The invention also provides the use of a mixture composed of alkanediols, comprising from 60 to 85 mol % of 1,6-hexanediol as main chain extender C1 and from 15 to 40 mol % of 1,3-propanediol as co-chain extender C2, as chain extender in the production of thermoplastic polyurethanes for inhibiting formation of deposit on moldings produced from the thermoplastic polyurethanes. The alkanediols here are preferably as defined above. The thermoplastic polyurethanes here are likewise preferably obtainable as described above.

The examples below provide further illustration of the invention.

EXAMPLES

Description of Storage Tests

Storage test 1: The specimens, heated at 100° C. for 20 h, are stored under standard conditions of temperature and humidity (23° C., 50% relative humidity).

Storage test 2: The unheated specimens are stored under standard conditions of temperature and humidity (23° C., 50% relative humidity).

Storage test 3: The heated specimens are stored at 80° C. in an oven.

Storage test 4: The unheated specimens are stored at 80° C. in an oven.

Storage test 5: The heated specimens are stored in an oven at 48° C. and at relative humidity of 100%.

Storage test 6: The unheated specimens are stored in an oven at 48° C. and at relative humidity of 100%.

Example 1

MFR

TPU specimens with a hard phase fraction of 0.60 based on HDI, and with a polyesterdiol whose molar mass is 2000, and with 1-6-hexanediol as main chain extender and 1,3-propanediol as co-chain extender were prepared using various molar proportions of the main chain extender (c1) based on the total molar amount n of the chain extenders used in the manual casting process, and were processed to give injection-molded sheets (120×95×2 mm). The sheets were stored under various conditions (storage test 1-6, various times).

| Specimen | | 1 comp | 2 comp | 3 | 4 | 5 comp | 6 comp |
|---|---|---|---|---|---|---|---|
| Hard segment | | 0.60 | 0.60 | 0.60 | 0.60 | 0.60 | 0.60 |
| Polyesterol (Mw 2000) | | X | X | X | X | X | X |
| 1-6-hexanediol | mol % | 100 | 90 | 75 | 65 | 50 | 0 |
| 1, 3-propanediol | mol % | 0 | 10 | 25 | 35 | 50 | 100 |
| HDI | | X | X | X | X | X | X |
| Storage test 1 | 42 d | No deposit | No deposit | No deposit | No deposit | No deposit | No deposit |

-continued

| | | | | | | | |
|---|---|---|---|---|---|---|---|
| Storage test 2 | 42 d | No deposit | No deposit | No deposit | No deposit | No deposit | No deposit |
| Storage test 3 | 42 d | Deposit | Deposit | No deposit | No deposit | No deposit | Deposit |
| Storage test 4 | 42 d | Deposit | Deposit | No deposit | No deposit | No deposit | Deposit |
| Storage test 5 | 120 h | Deposit | Deposit | No deposit | No deposit | Deposit | Deposit |
| Storage test 6 | 120 h | Deposit | Deposit | No deposit | No deposit | Deposit | Deposit |
| Storage test 5 | 250 h | Deposit | Deposit | No deposit | Deposit | Deposit | Deposit |
| Storage test 6 | 250 h | Deposit | Deposit | No deposit | Deposit | Deposit | Deposit |
| Storage test 5 | 420 h | Deposit | Deposit | No deposit | Deposit | Deposit | Deposit |
| Storage test 6 | 420 h | Deposit | Deposit | No deposit | Deposit | Deposit | Deposit |

The TPU specimens 3 and 4 of the invention are particularly advantageous when compared with the comparative compositions where the quantitative proportions of the chain extenders are not of the invention.

Example 2

TPU specimens with a hard phase fraction of 0.70 based on HDI and with a polyesterdiol whose molar mass is 2000, and with 1-6-hexanediol as main chain extender and 1,3-propanediol as co-chain extender were prepared using various molar proportions of the main chain extender (c1) based on the total molar amount n of the chain extenders used in the manual casting process, and were processed to give injection-molded sheets (120×95×2 mm). The sheets were stored under various conditions (storage test 1-6, various times).

| Specimen | | 7 comp | 8 | 9 | 10 comp |
|---|---|---|---|---|---|
| Hard segment | | 0.70 | 0.70 | 0.70 | 0.70 |
| Polyesterol (Mw 2000) | | X | X | X | X |
| 1,6-hexanediol | mol % | 100 | 75 | 65 | 100 |
| 1,3-propanediol | mol % | 0 | 25 | 35 | 0 |
| HDI | | X | X | X | X |
| Storage test 1 | 42 d | No deposit | No deposit | No deposit | No depos |
| Storage test 2 | 43 d | Deposit | No deposit | No deposit | Deposit |
| Storage test 3 | 42 d | Deposit | No deposit | No deposit | Deposit |
| Storage test 4 | 42 d | Deposit | No Deposit | No deposit | Deposit |
| Storage test 5 | 120 h | Deposit | No deposit | No deposit | Deposit |
| Storage test 6 | 120 h | Deposit | No deposit | Deposit | Deposit |
| Storage test 5 | 250 h | Deposit | No deposit | Deposit | Deposit |
| Storage test 6 | 250 h | Deposit | Deposit | Deposit | Deposit |
| Storage test 5 | 420 h | Deposit | Deposit | Deposit | Deposit |
| Storage test 6 | 420 h | Deposit | Deposit | Deposit | Deposit |

The specimens 8 and 9 of the invention are particularly advantageous when compared with the comparative compositions where the quantitative proportions of the chain extenders are not of the invention.

Example 3

TPU specimens with a hard phase fraction of 0.80 based on HDI and with a polyesterdiol whose molar mass is 2000, and with 1-6-hexanediol as main chain extender and 1,3-propanediol as co-chain extender were prepared using various molar proportions of the main chain extender (c1) based on the total molar amount n of the chain extenders used in the manual casting process, and were processed to give injection-molded sheets (120×95×2 mm). The sheets were stored under various conditions (storage test 1, 3-6, various times).

| Specimen | | 11 comp | 12 |
|---|---|---|---|
| Hard segment | | 0.80 | 0.80 |
| Polyesterol (Mw 2000) | | X | X |
| 1-6-hexanediol | mol % | 100 | 75 |
| 1-3-propanediol | mol % | 0 | 25 |
| HDI | | X | X |
| Storage test 1 | 42 d | No deposit | No deposit |
| Storage test 3 | 42 d | Deposit | No deposit |
| Storage test 4 | 42 d | Deposit | No deposit |
| Storage test 5 | 120h | Deposit | No deposit |
| Storage test 6 | 120h | Deposit | Deposit |

The specimen 12 of the invention is particularly advantageous in comparison with the comparative composition which comprises only hexanediol as chain extender.

The invention claimed is:

1. A thermoplastic polyurethane, obtained by a process comprising reacting
    at least one aliphatic, organic diisocyanate comprising at least 80% by weight of hexamethylene diisocyanate and up to 20% by weight of other aliphatic, organic diisocyanates, as component A,
    at least one compound which is reactive toward component A comprising at least one polyesterdiol of a dicarboxylic acid and at least one $C_{2-10}$ glycol and which has a weight-average molar mass of from 500 to 10 000 g/mol, as component B,
    a mixture composed of alkanediols as chain extenders, comprising from 65-78 mol % of 1,6-hexanediol as main chain extender C1 and from 22-35 mol % of 1,3-propanediol as co-chain extender C2, as component C,
    optionally at least one catalyst, as component D, and
    optionally a conventional additive as component E,
    wherein a molded sheet of said thermoplastic polyurethane does not display deposits after storage for 120 h at an oven temperature of 48° C. and 100% relative humidity.
2. A process for the production of a thermoplastic polyurethane according to claim 1, comprising reacting components A, B, C, and, D and E with one another, with mixing.

3. A molding, comprising the thermoplastic polyurethane as defined in claim 1.

4. A method of producing a molding comprising injection molding extruding, or sintering the thermoplastic polyurethane according to claim 1.

5. The thermoplastic polyurethane according to claim 1, wherein an amount of component C is 5 to 130% by weight based on component B.

6. The thermoplastic polyurethane according to claim 1, wherein at least on catalyst is used in an amount of 1 to 1,000 ppm based on said thermoplastic polyurethane.

7. The thermoplastic polyurethane according to claim 1, wherein component B has a weight-average molar mass of from 600 to 5,000 g/mol.

8. The thermoplastic polyurethane according to claim 1, wherein component B has a weight-average molar mass of from 700 to 4,200 g/mol.

9. The thermoplastic polyurethane according to claim 1, wherein component A and component B are reacted in a ratio of 1.5:1.0 to 10.0:1.0.

10. The thermoplastic polyurethane according to claim 1, wherein and NCO index is from 95 to 105.

11. The thermoplastic polyurethane according to claim 1, wherein said catalyst is dibutyltin dilaurate.

12. The thermoplastic polyurethane according to claim 1, wherein said polyesterdiol is at least one polyesterdiol selected from the group consisting of ethanediol polyadipates, 1,4-butanediol polyadipates, ethanediol 1,4-butanediol polyadipates, 1,6-hexanediol neopentyl glycol polyadipates and 1,6-hexanediol 1,4-butanediol polyadipates.

13. The thermoplastic polyurethane according to claim 1, wherein said polyesterdiol has a weight-average molar mass of from 600 to 5,000 g/mol.

14. The thermoplastic polyurethane according to claim 1, wherein said polyesterdiol has a weight-average molar mass of from 700 to 4,200 g/mol.

* * * * *